INVENTOR
WILLIAM A. WILLIAMSON
BY J.C. Wiesler
ATTORNEY

Nov. 7, 1967  W. A. WILLIAMSON  3,351,147
HYDROSTATIC DRIVE FOR VEHICLES
Filed Dec. 29, 1965  4 Sheets-Sheet 4

INVENTOR
WILLIAM A. WILLIAMSON
BY
ATTORNEY

United States Patent Office 3,351,147
Patented Nov. 7, 1967

---

3,351,147
HYDROSTATIC DRIVE FOR VEHICLES
William A. Williamson, Battle Creek, Mich., assignor to Clark Equipment Company, a corporation of Michigan
Filed Dec. 29, 1965, Ser. No. 517,254
10 Claims. (Cl. 180—6.3)

This invention relates to hydrostatic means for driving the wheels of vehicles, and more particularly to improvements in hydrostatic means utilizing variable displacement motors connected in series for driving the wheels.

It is an object of my invention to provide an improved hydrostatic drive mechanism which is of relatively simple and low cost construction, is compact, and which is so designed that the tractive effort of any one wheel is independent of the tractive effort of the other driven wheel or wheels.

Another object of the invention is to provide a hydrostatic drive in which a variable displacement hydraulic motor is associated with each driven wheel and is operatively connected to the steering mechanism so that differential wheel speed is accomplished during steering of the vehicle by adjustment of the speed of the respective wheels through the operation of the hydraulic motors.

Another object of the present invention is to provide in a hydrostatic drive system variable displacement motors connected to each other and to steering mechanism such that differential wheel speed during steering of the vehicle is accomplished by adjusting the displacement of the various hydraulic motors, the motors being connected to each other in series so that wheel spinning on slick surfaces is avoided by maintenance of traction on at least one drive wheel at all times.

Further objects, features and advantages of my invention will appear from the following detailed description of a preferred embodiment when taken in conjunction with the accompanying drawings, wherein.

Figure 2:
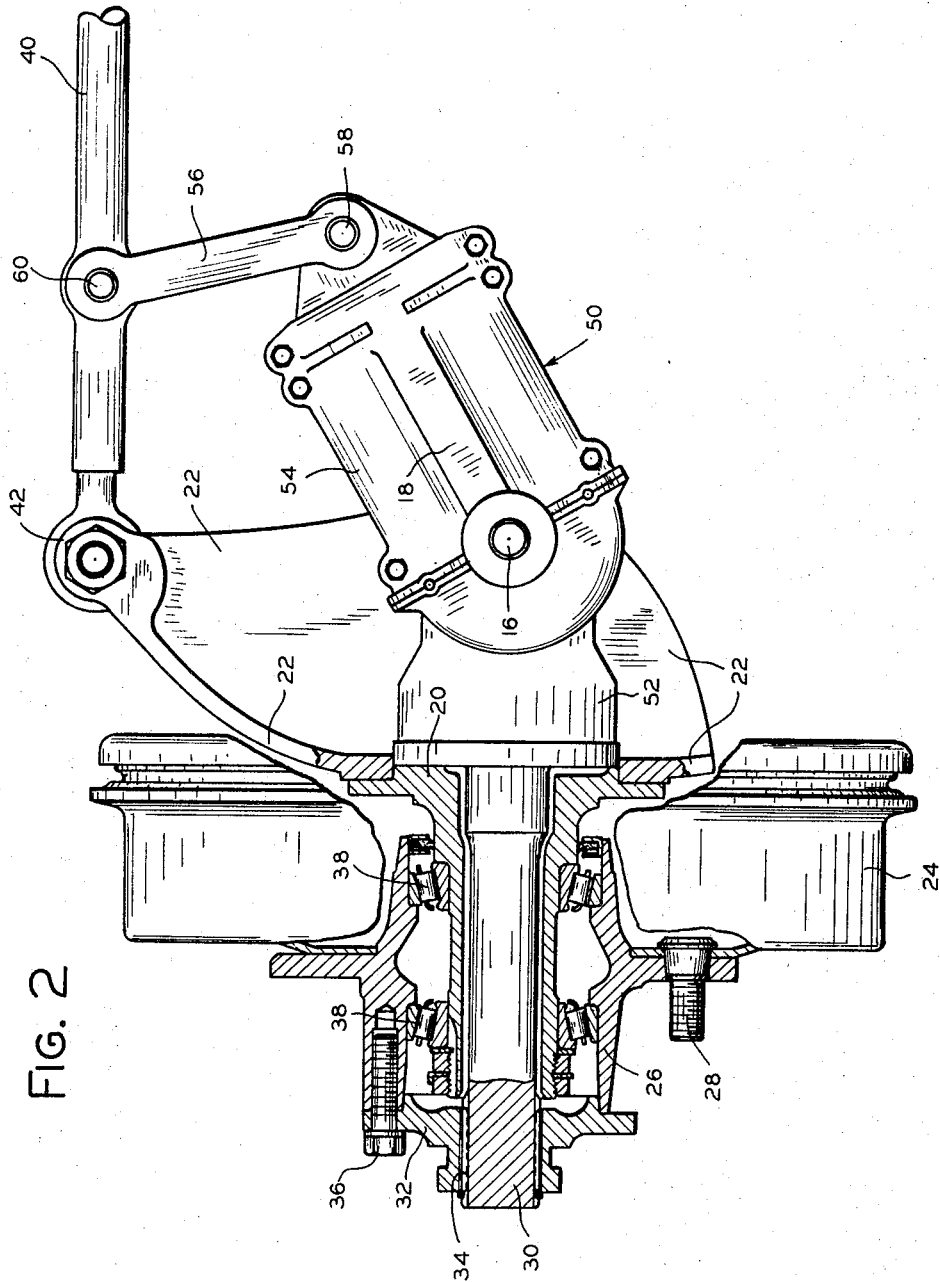
FIGURE 2 is an enlarged partial sectional view of the left rear hydraulic motor and wheel structure shown in FIG. 1.
Figure 4:
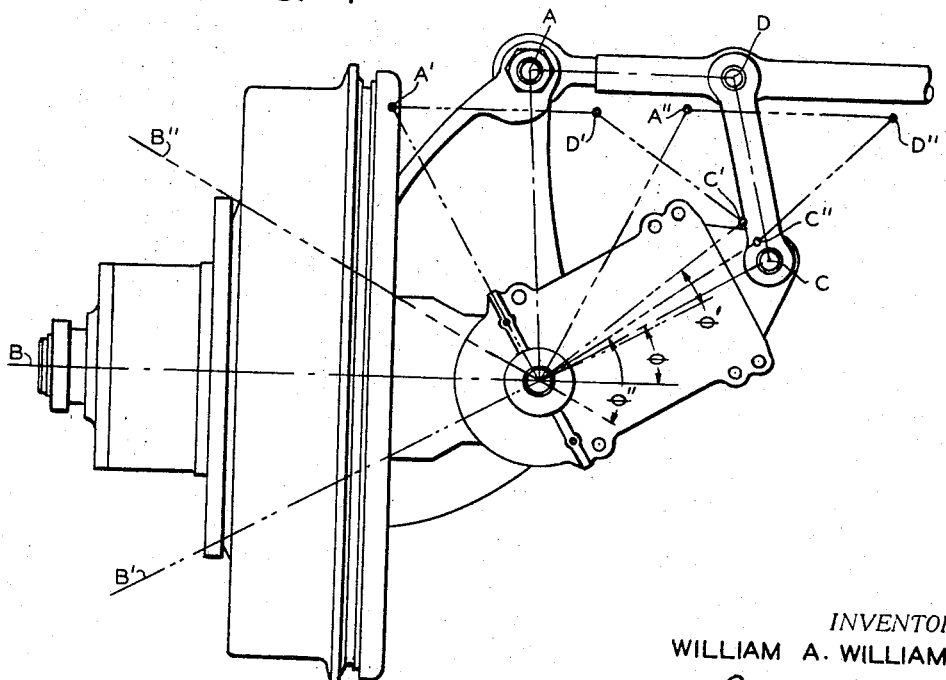
Figure 5:
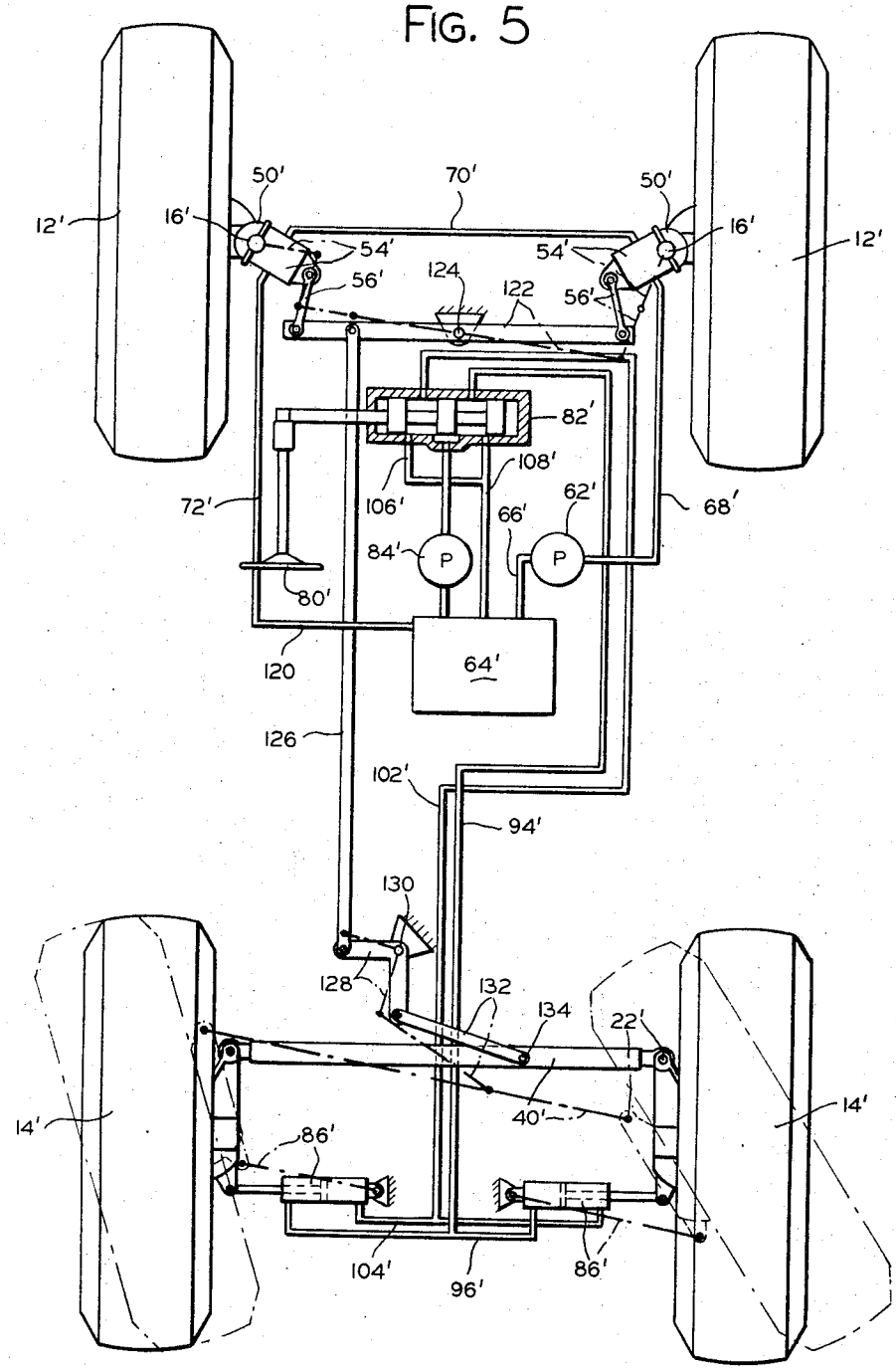

FIGURE 4 is a partial view of the structure of FIG. 2 which illustrates diagrammatically the relationships of the various parts when the wheel is turned to both left and right maximum steering; and FIGURE 5 is a schematized plan view of another embodiment of my invention in a two-wheel drive, two-wheel steer vehicle wherein the drive and steering devices are associated with different pairs of wheels.

Figure 1:
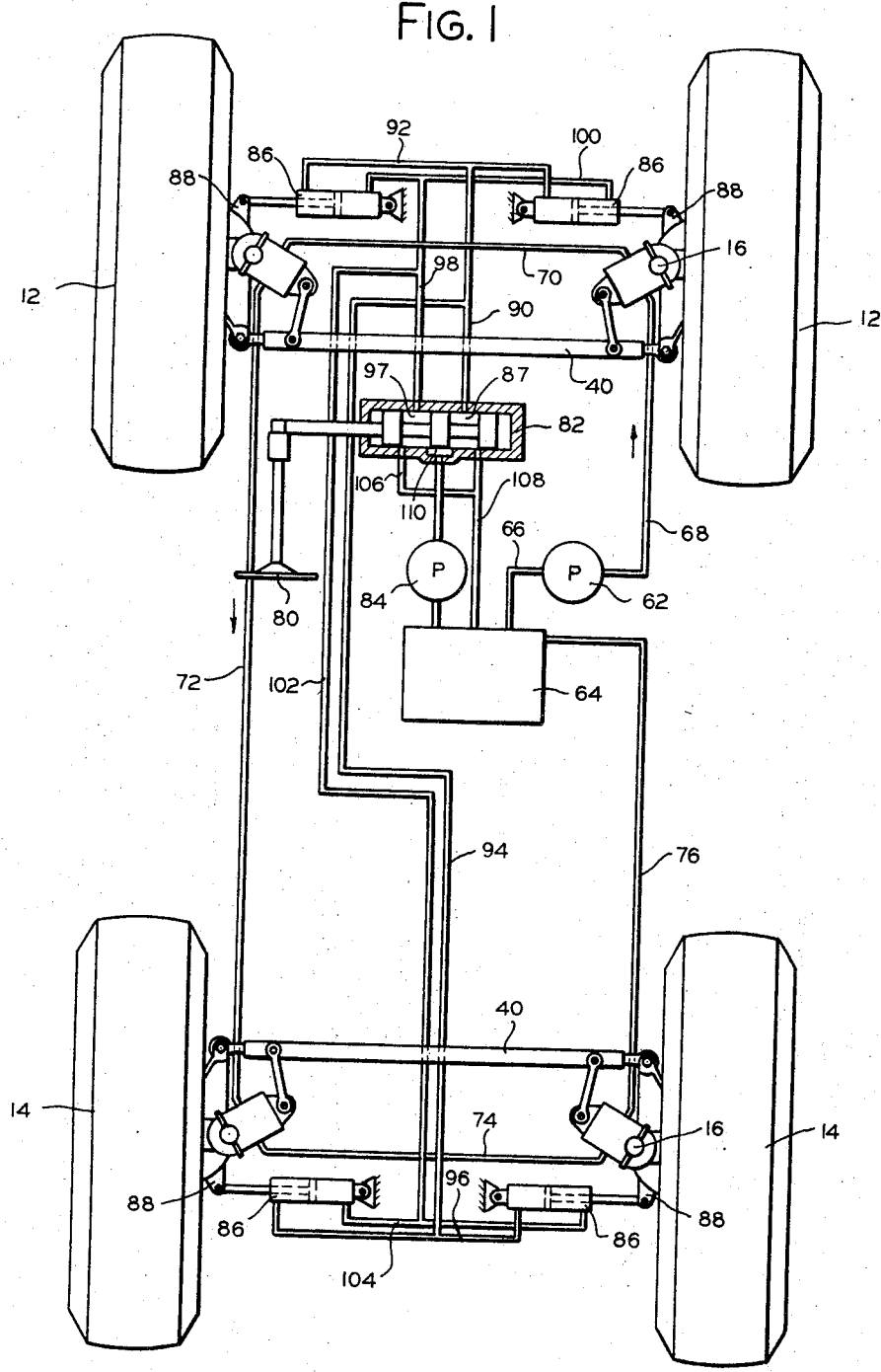
FIGURE 1 is a schematized plan view of my hydrostatic drive mechanism in a four-wheel drive vehicle, in combination with hydraulic steering means therefor.
Figure 3:
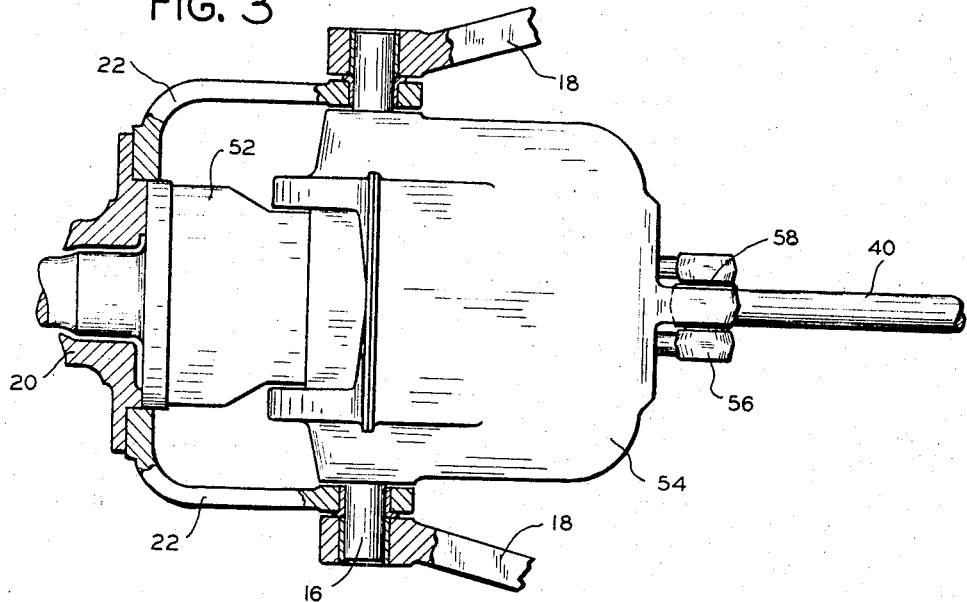
FIGURE 3 is a partial sectional front view of FIG. 2.

Referring now in detail to the drawings, the hydrostatic drive system as shown schematically in FIG. 1 illustrates a hydraulic steering system for a four-wheel drive four-wheel steer vehicle in which the front pair of wheels are shown at numeral 12 and the rear pair of wheels at numeral 14. Each of the wheels is dirigibly mounted upon a kingpin 16 which is supported from the frame of the vehicle, not shown, by upper and lower suspension arms 18 (FIG. 3), and to which a wheel spindle 20 is connected for steering the wheel by means of upper and lower arms 22 (FIG. 3), only one of which is shown in FIG. 2 for clarity. A brake drum 24 (FIG. 2) of each wheel is secured to a wheel hub 26 by means of ring mounting studs 28 and to the axle shaft 30 by means of a retainer or mounting member 32 which is connected to the axle shaft for rotation by a spline 34 and to the hub by a ring of bolts 36. Roller bearing means 38 support the hub 26 from spindle 20, as shown in FIG. 2. A tie rod 40 is pivotally connected between each pair of wheels to ends 42 of the respective steering arms 22. The steering linkage is of the well-known "Ackerman" type.

A variable displacement hydraulic motor 50, preferably of the tilting head type, as shown, but which may be of the swash plate type, is mounted upon each kingpin 16 for pivotal movement from the straight-ahead wheel position shown in solid lines in the figures to different angular positions in relation to the axis of axle shaft 30 as a function of the direction and angle of steer of wheels 24. The left and right maximum steer angles of the left-rear wheel and the effect thereof on the said relative position of the motor 50 with respect thereto is represented in FIG. 4 by the angles $\theta'$ and $\theta''$, to be described in detail hereinbelow. A fixed housing portion 52 of each motor 50 is secured at the peripheral portion of the outer face thereof to wheel spindle 20, axle shaft 30 extending into housing 52 and being suitably connected to the output or drive shaft of motor 50 for driving each wheel 14 in known manner.

Each motor 50 embodies a plurality of annularly disposed reciprocating pistons rotatable with a piston rotor, the displacement of said piston being variable in well-known manner as a function of the pivotal position of the rotor, the motor piston rotor being pivotable with forward motor housing 54 about kingpin 16 to vary the displacement of the motor pistons. A hydraulic motor construction of the general type here contemplated is manufactured, for example, by Eaton Yale & Towne Inc. A pair of upper and lower compensating links 56 connect the inner end of each motor housing 54 to the adjacent end portion of tie rod 40 by means of pivot pins 58 and 60 so that movement of tie rod 40 to the right or to the left during dirigible movement of the connected pair of wheels effect through the compensating links 56 a pivotal movement of the respective motor housing 54 on kingpins 16, which compensate for the direction and angle of steer at each wheel by varying the r.p.m. of the wheel as a function of said direction and angle of steer, all in a manner to be described. The pairs of motors and links 50 and 56 which are connected to the respective pairs of wheels 12 and 14, are mounted in allochiral relationship to each other.

An engine driven pump 62, which may be either of a fixed or variable displacement type, is connected by conduit 66 on the inlet side to an oil reservoir 64, and is connected on the discharge side in series to the four motors 50 by conduits 68, 70, 72, 74, and 76. The entire flow of fluid from the discharge side of each motor 50 flows to the inlet of the next motor connected in series as shown, so that no differential speed action as between the wheels of either pair of wheels 12 and 14 is possible so long as the respective motors are operating at the same speed, which is the case when the wheels are in a straight-ahead position, in which condition the angles of the tilting heads or motor housing 54 of the various motors are identical, as represented in FIG. 2. For any given volume of oil discharged by pump 62 into the system, with the wheels in a straight-ahead position, a fixed r.p.m. will be imparted to all of the wheels for any given road and load condition. The engine, not shown, may be of any suitable type, whether gasoline, diesel, or gas turbine. Vehicular speed is therefore varied by control of engine speed which varies the volume output of pump 62, and in turn the rotational speed of each motor 50 and of the wheels 12 and 14 in proportion to engine speed.

A hydraulic power steering system is shown schematically in FIG. 1. It includes a steering wheel 80 connected suitably to operate an open-center spool valve 82 for directing the flow of pressure fluid when steering is demanded by the operator from a fixed displacement pump 84 to one or the other ends of a plurality of power steering cylinders 86, the piston rod ends of which are connected to respective ones of a plurality of links 88. A conduit 90 connects the chamber 87 of valve 82, located between the right-hand pair of spools, to one pair of opposite ends of the forward pair of cylinders 86 by a branch conduit 92 and to the corresponding ends of the rear pair of cylinders 86 by a conduit 94 and a branch conduit 96. The chamber 97 of valve 82, located between the left-hand pair of spools, is connected to the other pair of ends of forward cylinders 86 by conduits 98 and 100 and to the corresponding pair of ends of the rear pair of cylinders 86 by conduits 102 and 104. Chambers 87 and 97 are both open to reservoir 64 when the spool valve is in centered position, as shown, and the discharge of pump 84 is by-passed from these chambers to the reservoir by conduits 106 and 108, center open port 110 being wider than the center spool so that pump 84 operates continuously during engine operation, the discharge thereof being directed either to the reservoir or to one or the other pairs of ends of the four cylinders 86. Steering to the right is effected by rotating steering wheel 80 in a clockwise direction which actuates the spool valve leftwardly, thereby connecting pump discharge pressure fluid to the left ends of forward cylinders 86 by way of conduits 90 and 92, and to the left ends of rear cylinders 86 by way of conduits 90, 94 and 96 to effect clockwise dirigible movement of wheels 12 and counterclockwise dirigible movement of wheels 14 on kingpins 16. Steering to the left is accomplished by turning wheel 80 counterclockwise which actuates the spool valve to the right to connect pump discharge fluid pressure to the right ends of forward cylinders 86 and to the right ends of rear cylinders 86 by way of conduits 98, 100, 102 and 104. The ends of cylinders 86 opposite the fluid pressurized ends are vented to reservoir 64 by way of the conduits which communicate said opposite ends with conduits 106 and 108 through the non-pressurized chamber of spool valve 82. During turning of the vehicle either to the right or to the left from a straight-ahead position of the wheels, movement of the front and rear tie rods 40 actuates the compensating links 56 at each end of each tie rod to vary the displacement of the motor 50 which is connected to the respective link in a direction to increase the speed of the outside wheel and to decrease the speed of the inside wheel, whereby to effect a differential speed between the wheels are required to avoid skidding of either wheel.

Referring to FIG. 4, I have illustrated by broken lines the positions of the various movable elements of the drive motor and connected steering elements which are associated with the left rear wheel 14 for maximum left and right steering angles. $\theta$ designates the angle of the tiltable head motor 50 when the wheel 14 is in a straight-ahead position. $\theta'$ is the angle when the wheel is in a full right turn position, and $\theta''$ when the wheel is in full left turn position. The letters A, B, C and D indicate the positions of the parts so designated when the wheel is in straight-ahead position, the letters A', B', C' and D' illustrate the location of the same parts in a full right turn position, and the letters A", B", C" and D" illustrate the location of those parts in a full left turn position. It will be noted that angle $\theta'$ is substantially less than angle $\theta$ which causes the left wheel 14 to rotate at a proportionately higher r.p.m. for a given volume of fluid driving motor 50, whereas $\theta''$ is substantially larger than angle $\theta$ which causes said wheel 14 to be driven at a substantially slower r.p.m. for the same volume of fluid driving motor 50. In other words, the left rear wheel 14 when actuated by left rear cylinder 86 in a counterclockwise direction to any given right-hand steering angle effects a variation in the angle of motor housing 54 to a value between angle $\theta$ and angle $\theta'$ which is proportional to the steering angle of said wheel 14, thereby effecting an increase in r.p.m. in the outside rear wheel which is proportional to the right-hand steering angle of said wheel. Conversely, actuation of said cylinder 86 in an opposite direction to actuate said wheel 14 in a clockwise direction for left-hand steering movement effects a change in the angle of motor housing 54 to a value between angle $\theta$ and angle $\theta''$, which value is proportional to the left-hand steering angle of said wheel 14, thereby effecting a decrease in the r.p.m. of said wheel proportional to the steering angle. The pairs of motors 50 being in allochiral relationship causes an opposite result in wheel r.p.m. with respect to the opposite wheel of each pair. That is, an increase in r.p.m. of left rear wheel 14 during right-hand steering of the vehicle combines with a decrease in the r.p.m. of right-hand wheel 14 during such steering movement so that the pair of wheels 14 maintain traction and track without slipping. Likewise, in respect of the forward pair of wheels 12.

It will now be appreciated by persons skilled in the art that I have provided in the embodiment of my invention described above an improved hydrostatic drive system for a vehicle in which the in wheel hydraulic motors are connected in series, and the displacement of these motors is varied as a function of steering direction and angle in order to provide the correct differential speeds between the pairs of wheels during turning operations. One of the important features of my invention relates to the fact that the tractive effort on any one wheel is independent of the tractive effort of all the other wheels. If, in the four-wheel drive vehicle disclosed herein, three of the wheels lose traction the fourth wheel is still capable of developing full tractive effort as a result of the in series hydraulic relationship of the motors, whether the vehicle is moving straight ahead or turning in either direction.

It should also be noted that my invention is versatile, and changes and modifications can be made therein without departing from the scope of the invention. For example, although I have described above a four-wheel drive, four-wheel steer vehicle, it will be apparent that my invention is also applicable to vehicles having two-wheel drive, two-wheel steer, or two-wheel drive, four-wheel steer.

Referring now to the embodiment of FIG. 5, wherein similar parts have been similarly numbered with a prime designation, there is illustrated schematically a vehicle having two front non-dirigible drive wheels 12' and two rear dirigible non-drive wheels 14'. The steering system is similar to that shown in FIG. 1, except that it is connected to steer only rear wheels 14'. Steering wheel 80' operates spool valve 82', the same as in FIG. 1, to direct the discharge of pump 84' to rear steer cylinders 86' by way of conduits 94', 96' and 102', 104'. Steering linkage 40' is connected between wheels 14' to effect differential steering angles during turning operations, the same as in FIG. 1.

Non-dirigible front wheels 12' have connected thereto variable displacement hydraulic motors 50' mounted on pivots 16', the same as in FIG. 1. The pivots 16' in FIG. 5, do not, of course, support wheels 12' for pivotal movement, but pivotally support only forward motor housing 54' for the purpose previously specified. Pump 62' supplies discharge pressure fluid in series to motors 50' through conduits 68', 70', 72' and 120. A compensating link 56' pivotally connects the inner end of each motor housing 54' to the adjacent end portion of a motor displacement control lever arm 122 which is mounted centrally thereof upon a fixed pivot 124. A link rod 126 is pivotally connected at the forward end to lever 122 near the connection thereto of the left-hand compensating link 56′, and at its opposite end to the one arm of a bell crank 128, the center pivot of which is secured at 130 and the other arm of which is pivotally connected to a link 132, which latter link is pivotally connected at 134 to the tie rod 40′ at a location near the connection thereof of the tie rod to the right-hand steering arm 22′ of wheel 14′.

In operation, with wheels 14′ in straight-ahead position, as shown in solid lines in FIG. 5, motors 50′ and the connections thereof to lever 122 by links 56′ are in allochiral relationship, and links 126 and 132, and bell crank 128, are disposed as illustrated in solid lines. If the operator desires to steer the vehicle to the right, spool valve 82′ is operated to direct pressure fluid through lines 94′ and 96′, thereby actuating steer cylinders 86′ rightwardly to dispose the wheels in a right turn position, such as illustrated in broken lines, in which the position tie rod 40′ and its connections to the steering arms effects a differential steering angle in well-known manner. Resultant leftward movement of tie rod 40′ actuates link 134 leftwardly to rotate bell crank 128 in a clockwise direction which causes link 126 to move forwardly thereby pivoting lever 122 about pivot 124 to a position such as is illustrated by the broken center line. Pivotal movement of lever 122 operates compensating links 56′ of the respective motors 50′ to decrease the displacement of the left-hand motor and increase the displacement of the right-hand motor. Such movement of the tilting heads 54′ of the motors causes an increase of rotational speed of left wheel 12′ and a decrease in rotational speed of right wheel 12′. The linkage elements which interconnect tie rod 40′ to motors 50′ should, of course, have such a geometrical relationship as to actuate the tilting heads of the motors in amounts which are proportional to the steering direction and angles of wheels 14′ so that the relative change in speed of the respective wheels 12′ allow said wheels to negotiate turns without scrubbing. If the operator desires to turn to the left the reverse of the above operation occurs, whereby left-hand motor 50′ slows the rotational speed of left wheel 12′ with increased motor displacement, and right-hand motor 50 increases the rotational speed of right wheel 12′ with decreased motor displacement.

Although I have described and illustrated only two embodiments of my invention, it will be understood by those skilled in the art that modifications may be made in the structure, form and relative arrangement of parts without necessarily departing from the spirit and scope of the invention. Accordingly, it should be understood that I intend to cover by the appended claims all such modifications which fall within the scope of my invention.

I claim:

1. In a motor vehicle having at least one pair of laterally spaced dirigible drive wheels, a variable displacement hydraulic motor connected to each said wheel for driving said wheel, pump means connected hydraulically to said motors for driving the latter, conduit means connecting said pump means and motors in series flow relation, means interconnecting said wheels for coordinating dirigible movement of the latter, and motor compensating means connecting each of said motors to said wheel coordinating means for varying the displacement of said motors during turning operation of the vehicle such that differential speed is effected between the wheels as a function of the direction and angle of steer thereof.

2. A motor vehicle as claimed in claim 1 wherein the said pair of hydraulic motors and means connecting the same to said wheel coordinating means are in allochiral relationship when the wheels are positioned for straight-ahead vehicular operation, kingpins mounting each wheel for dirigible movement, said hydraulic motors having portions thereof mounted for pivotal movement about the axis of said kingpins.

3. A motor vehicle as claimed in claim 1 wherein said wheel coordinating means comprises a tie rod and a steering arm connecting each opposite end of the tie rod to one of the wheels, said compensating means being pivotally connected to a pivotable portion of each hydraulic motor and to each end portion of the tie rod, said hydraulic motors having susbtantially equal displacements during straight-ahead operation of the vehicle, dirigible movement of said wheels in one or the other directions effecting a movement of said tie rod and compensating means for varying the displacements of the motors such that the r.p.m. of the inside wheel decreases the r.p.m. of the outside wheel increases in proportion to both the steering direction and angle of said wheels.

4. A motor vehicle as claimed in claim 1 wherein a second pair of laterally spaced dirigible drive wheels are provided, and a variable displacement hydraulic motor connected to each of said second pair of wheels for driving said wheels, said conduit means connecting said pump means and all of said motors in series flow relation.

5. A motor vehicle as claimed in claim 4 wherein the displacement of each of said hydraulic motors is coordinated with the steering direction and angle of the respective drive wheel with which the motor is associated in such a manner that the displacement of all said motors is substantially the same during straight-ahead operation of the vehicle, the displacement of the pair of motors operatively connected to the inside pair of wheels during turning operation of the vehicle varies to effect a decrease in the r.p.m. of said inside wheels, and the displacement of the pair of motors operatively connected to the outside pair of wheels during such turning operation varies to effect an increase in the r.p.m. of said outside wheels.

6. A hydrostatic drive system for motor vehicles having a prime mover and at least one pair of laterally spaced dirigible drive wheels, comprising a variable displacement hydraulic motor for driving each said wheel, a hydraulic pump for driving said motors at a speed which varies with the speed of the prime mover, conduit means connecting said pump and said motors in series flow relation with each other, means for turning said wheels to steer the vehicle, and compensating means operatively connected to said latter means for varying the displacement of said motors such that with a given volume of fluid driving said motors the speed of the inside wheel decreases below the speed thereof in non-dirigible position, and the speed of the outside wheel increases above the speed thereof in non-dirigible position.

7. A hydrostatic drive system as claimed in claim 6 wherein said series flow connection between said pump and motors effects continuous traction on at least one of said wheels during operation, and kingpin means mounting each of said wheels for dirigible movement, each of said motors being a tilting head motor being pivotally mounted from the respective kingpin means for varying the displacement of each said motor during dirigible movement of the wheels as a function of the direction and angle of steer imparted to said wheels by said turning means.

8. In a motor vehicle having two pairs of laterally spaced wheels, at least one pair of which are dirigible wheels, a variable displacement hydraulic motor connected to each of at least one pair of said wheels, operator controlled steering means connected to said pair of dirigible wheels for steering the same, pump means connected hydraulically to said motors for driving the latter, conduit means connecting said pump means and motors in series flow relation, and motor compensating means operatively connecting each of said motors to said steering means for varying the displacement of said motors such that upon actuation of said dirigible wheels to steer the vehicle to the right or to the left and with a given volume of fluid driving said motors, said operative connection is operated by said steering means to vary the displacement of the motor connected to the inside driven wheel to decrease the speed thereof and of the motor connected to the outside driven wheel to increase the speed thereof.

9. A motor vehicle as claimed in claim 8 wherein said dirigible wheels comprise one pair of said pairs of wheels and said motor driven wheels comprise the other pair thereof, said operative connection between said motors and steering means extending between said pairs of wheels to effect a variation in the displacement of the motors of the driven non-dirigible wheels upon turning of the non-driven dirigible wheels in either direction.

10. A motor vehicle as claimed in claim 9 wherein said operative connection comprises motor displacement control linkage means interconnecting the motors, and means connecting said control linkage means to the portion of the steering means which is operatively connected to the pair of dirigible wheels.

References Cited

UNITED STATES PATENTS

| | | | |
|---|---|---|---|
| 2,941,609 | 6/1960 | Bowers et al. | 180—6.48 |
| 3,138,218 | 6/1964 | Mark et al. | 180—6.3 |
| 3,151,694 | 10/1964 | Rogers | 180—51 |

BENJAMIN HERSH, *Primary Examiner.*

L. D. MORRIS, *Assistant Examiner.*